May 21, 1940.        C. BROCKMAN         2,201,758
SOIL CULTIVATING DEVICE
Filed Sept. 29, 1939        3 Sheets-Sheet 1

Inventor
Clarence Brockman

By Clarence A. O'Brien
and Hyman Berman
Attorneys

May 21, 1940.  C. BROCKMAN  2,201,758
SOIL CULTIVATING DEVICE
Filed Sept. 29, 1939   3 Sheets-Sheet 2

Inventor
Clarence Brockman

By Clarence A. O'Brien
and Hyman Berman
Attorneys

May 21, 1940.  C. BROCKMAN  2,201,758
SOIL CULTIVATING DEVICE
Filed Sept. 29, 1939  3 Sheets-Sheet 3
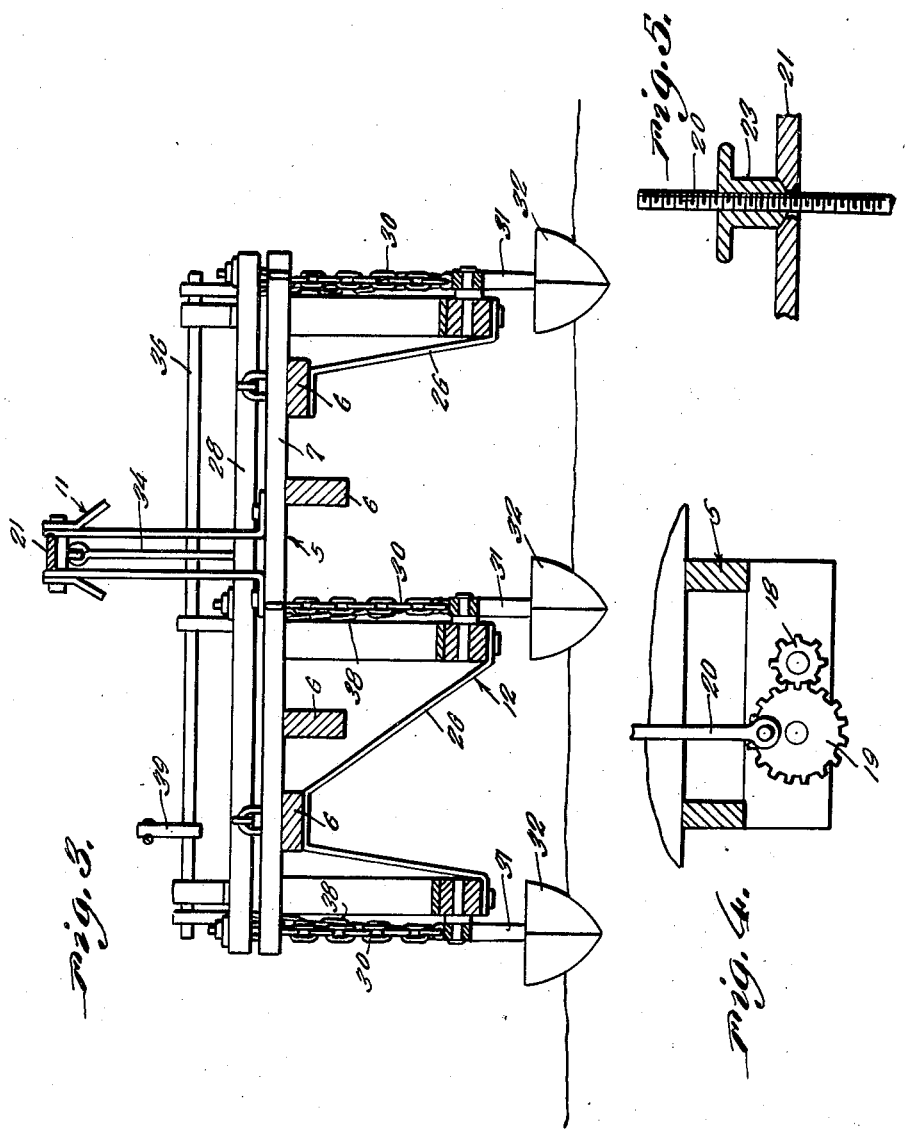
Inventor
Clarence Brockman
By Clarence A. O'Brien
and Hyman Berman
Attorneys Patented May 21, 1940

2,201,758

UNITED STATES PATENT OFFICE 2,201,758

SOIL CULTIVATING DEVICE

Clarence Brockman, Wayne, Nebr.

Application September 29, 1939, Serial No. 297,169

5 Claims. (Cl. 97—55)

This invention relates to a soil cultivating device, and has for the primary object the provision of a device of this character which may be readily adapted to a tractor or any other similar draft medium and which will act on the soil to form interrupted furrows, so that the soil left undisturbed between the furrows will form dams for the purpose of trapping water in the furrows for gradual absorption by the soil and thereby efficiently irrigate the soil between row crops as well as cultivating the soil between said crops.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a soil cultivating device hitched to a fragmentary portion of a tractor.

Figure 3 is a transverse sectional view taken on the line 3—3 of Figure 2.

Figure 4 is a detail sectional view taken on the line 4—4 of Figure 2.

Figure 5 is a detail sectional view illustrating an adjustable connection between a pitman and a walking beam.

Figure 1:
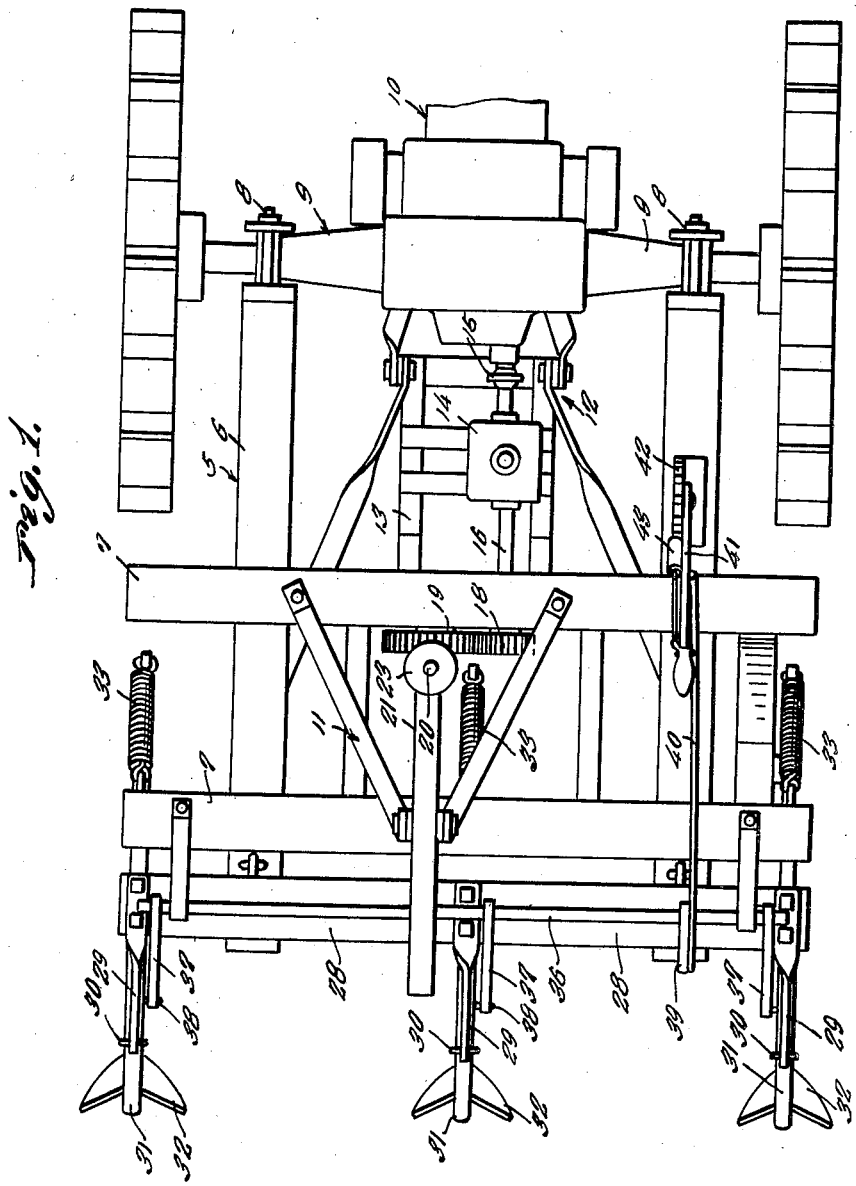
Figure 2:
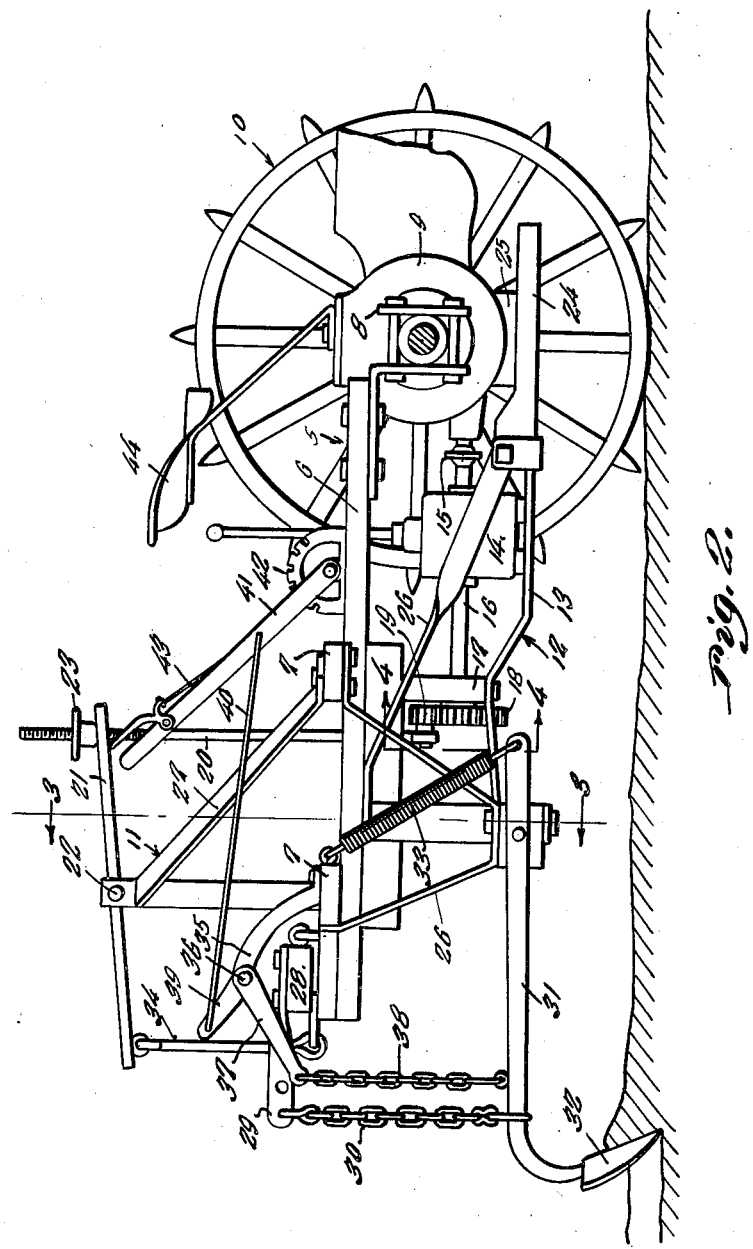
Figure 2 is a side elevation, partly in section, illustrating the same.

Referring in detail to the drawings, the numeral 5 indicates a main frame consisting primarily of longitudinally extending beams 6 and transverse beams 7. The forward ends of the beams 6 are provided with clamps 8 for detachably securing the main frame on the rear axle housing 9 of a tractor 10, a fragmentary portion of which is shown in the drawings.

Upper and lower sub-frames 11 and 12 are secured to the main frame. The lower sub-frame includes a platform construction 13 on which is mounted a variable speed transmission 14 of a conventional construction and is connected to a power takeoff of the tractor, as shown at 15, and also is connected to a shaft 16 journaled in a bearing or mounting 17 supported by the main frame and the sub-frame 12 and has secured thereto a gear 18 meshing with a pitman gear 19 journaled on the main frame and to which is eccentrically pivoted a pitman 20 adapted for pivotal connection with a walking beam 21 pivoted on the upper sub-frame 11, as shown at 22. The pitman 20 extends freely through an opening provided in the walking beam and has threaded thereon a bearing element 23 which seats in a socket provided in the walking beam about the opening so that the pitman may readily pivot on the walking beam and still may be adjusted with respect to the walking beam for the purpose of increasing and decreasing the stroke or movement of the walking beam.

The lower sub-frame 12 besides including the platform construction 13 also is provided with forwardly extending members 24 provided with cupped bearing member 25 to engage under the axle housing 9 of the tractor 10. Braces 26 connect the lower sub-frame with the main frame and braces 27 connect the main frame with the upper sub-frame.

Hinged on the rearmost transverse member 7 of the main frame 5 is a bar or member 28 which extends transversely of the main frame and has secured thereto rearwardly extending arms 29 to which are connected chains or flexible elements 30. Shovel beams 31 are pivotally mounted on the sub-frame 12 and have secured thereto ground engaging shovel elements 32. The forward ends of the shovel beams have connected thereto coil springs 33 which are secured on the main frame and act to urge the shovel elements into engagement with the ground. The chains or flexible elements are connected to the shovel beams. A link 34 is pivoted to the member 28 and to the walking beam 21. The power received from the tractor through the variable transmission imparts movement to the walking beam and the latter in turn imparts hinging movement to the member 28 which brings about raising and lowering of the shovel elements with respect to the ground. During the forward movement of the tractor with the device in operation the shovel elements will dig furrows in the soil and at certain times will be elevated from the soil and then allowed to again engage the soil to continue making of the furrows so that the undisturbed soil between the furrows will form dams for trapping in the furrows water which may be gradually absorbed by the soil.

Brackets 35 mounted on the main frame 5 support a shaft 36 for rotation and transversely of the main frame above the member 28. The shaft has secured thereto arms 37 which are connected to the shovel beams 31 by chains or flexible elements 38. An arm 39 is formed on the shaft 36 and has pivoted thereto a connecting link or rod 40 which is in turn pivoted to a control lever 41. The control lever is pivoted on a rack 42 carried by the main frame 5 and is equipped with a detent mechanism 43 to coact with the rack in locking the control lever in different positions. Through the control lever 41 it is possible to elevate the shovel elements clear of the ground so that the tractor can be driven to any place desired without the shovel elements acting on the ground.

It is preferable that the control lever 41 and the control of the variable transmission be located on the forward portion of the device so as to be in convenient reach of the operator of the tractor seated upon the seat 44.

The invention above described in detail may be hitched to the rear of a tractor type cultivator so that the soil after being cultivated may be acted on by this invention to form therein the dammed furrows for irrigation purposes, thereby permitting the soil to be prepared as specified in one operation.

It is believed that the foregoing description, when taken in connection with the drawings will fully set forth the construction and advantages of this invention to those skilled in the art to which such a device relates, so that further detailed description will not be required.

Having thus described the invention, what I claim is:

1. In a device of the character described, a main frame mountable on a tractor and extending rearwardly therefrom, furrow forming elements pivotally mounted on the main frame, a raising and lowering means carried by the frame and connected to the furrow forming elements, a variable speed drive means carried by said frame and operated by a power takeoff of a tractor, and means for connecting said drive means to said raising and lowering means.

2. In a device of the character described, a main frame mountable on a tractor and extending rearwardly thereof, furrow forming elements pivotally mounted on the frame, spring means acting on the furrow forming elements to urge the latter into engagement with the ground, a walking beam pivotally mounted on the frame, means for connecting the walking beam to the furrow forming elements, and a drive mechanism connected to and operated by a power takeoff of the tractor and connected to the walking beam.

3. In a device of the character described, a main frame mountable on a tractor and extending rearwardly thereof, furrow forming elements pivotally mounted on the frame, spring means acting on the furrow forming elements to urge the latter into engagement with the ground, a walking beam pivotally mounted on the frame, means for connecting the walking beam to the furrow forming elements, a variable speed transmission carried by the frame and operatively connected to a power takeoff of the tractor, a shaft driven by the transmission, a pitman adjustably and pivotally connected to the walking beam, and an eccentric drive between the pitman and the shaft.

4. In a device of the character described, a main frame, means for mounting the frame on a tractor, upper and lower sub-frames carried by the main frame, a walking beam pivoted on the upper sub-frame, furrow forming elements pivotally mounted on the lower sub-frame, spring means acting on said furrow forming elements, a member hinged on the main frame, a link connecting the walking beam to said member, arms secured on said member, flexible means connecting the arms to the furrow forming elements, a pitman connected to the walking beam, a variable speed transmission supported by the lower sub-frame and connected to a power takeoff of a tractor, a shaft driven by the transmission, a gear secured to the shaft, a second gear meshing with the first gear and journaled on the main frame and having the pitman eccentrically pivoted thereto.

5. In a device of the character described, a main frame, means for mounting the frame on a tractor, upper and lower sub-frames carried by the main frame, a walking beam pivoted on the upper sub-frame, furrow forming elements pivotally mounted on the lower sub-frame, spring means acting on said furrow forming elements, a member hinged on the main frame, a link connecting the walking beam to said member, arms secured on said member, flexible means connecting the arms to the furrow forming elements, a pitman connected to the walking beam, a variable speed transmission supported by the lower sub-frame and connected to a power takeoff of a tractor, a shaft driven by the transmission, a gear secured to the shaft, a second gear meshing with the first gear and journaled on the main frame and having the pitman eccentrically pivoted thereto, and means carried by the main frame and connected to the furrow forming elements for elevating and supporting the latter from the ground.

CLARENCE BROCKMAN.